Feb. 27, 1940. L. W. SHUTTS ET AL 2,191,631
BRAZING OF THIN METAL STRUCTURES
Filed Sept. 28, 1938

Inventors
Leroy W. Shutts &
Philip S. Rosenberg
By
Blackmore, Spencer & Flint
Attorneys Patented Feb. 27, 1940

2,191,631

UNITED STATES PATENT OFFICE 2,191,631

BRAZING OF THIN METAL STRUCTURES

Leroy W. Shutts and Philip S. Rosenberg, Lockport, N. Y., assignors to General Motors Corporation, Detroit, Mich., a corporation of Delaware Application September 28, 1938, Serial No. 232,084

1 Claim. (Cl. 113—118)

This invention relates to the manufacture of heat exchange units and more particularly to a process for joining the elements of a radiator core unit.

The difficulties experienced with soldered extruded tube radiators in aircraft use because of high temperature and vibration have led to efforts to develop a practical method of brazing extruded tube cores. Such tubes have a wall thickness usually about .006 inch, which is too thin to permit brazing the edges of the hexagonal end with a hand torch or open flame because of the lack of temperature control and the likelihood of excessive heating. Brazing an extruded tube core section in a controlled hydrogen atmosphere furnace is unsatisfactory because it is not feasible to prelocate the brazing alloy in a satisfactory position for proper flow. If the core is placed in an oven with the tubes vertically disposed, the brazing material around the tubes will flow into the joints in the lower face by gravity, but with uniform heat throughout the core the brazing alloy intended for the joints in the upper face will simply melt and not flow properly to the joints. The use of two different alloys of different brazing temperatures for the joints in the respective faces has been considered with the idea of first brazing the lower melting point alloy on the bottom face and then turning over the core and re-heating to a higher temperature for the brazing operation in the other face, but the annealing action on the tubes because of the higher temperature is objectionable.

To concentrate the brazing temperature, it is here proposed to dip successively the opposite faces of the core in a molten salt bath held at proper temperature to melt and flow the brazing alloy down into the joints by gravity. Thus the brazing heat is applied only to the submerged parts and the upper ends of the tubes in the exposed core face do not reach a temperature sufficient to melt the brazing alloy provided therefor. The immediate application of heat to the exact surfaces to be brazed and the short time interval required for flowing the brazing alloy into the joints reduces the likelihood of an annealing action on the tube material and is an important feature of the present process.

A primary object of the invention is to provide a method for brazing together the ends of very thin wall tubes in the assembly of a radiator core. A further object is to enable the construction of a core in sections, the sections subsequently to be bonded together in proper number to complete a core of whatever size is desired. To this end the tubes of individual sections may be bound together with light sheet metal frames and bonded thereto in the salt bath brazing operation so that later the frames of several sections can be torch brazed together, the frames being of sufficiently thick stock to permit torch brazing.

Figure 1:
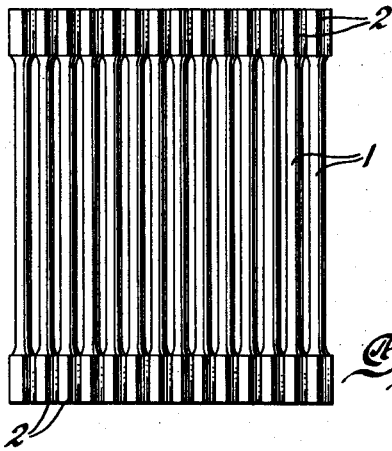
Fig. 1 shows in elevation an extruded tube core.

The core shown in Fig. 1 is of a well known type and consists of a series of extruded copper tubes 1—1, each having its opposite ends expanded for a short length and of hexagonal section as at 2—2. When the tubes are brought together with the hexagonal end portions 2—2 in nested relation, the flat walls thereof are in abutting contact at both ends of the assembly and the intermediate portions of the tubes are spaced apart. With the abutting tube surfaces in both faces properly joined and sealed, the exchange of heat in the use of the core is between fluid flowing through the hollow tubes and fluid flowing between or exteriorly of the tubes.

Figure 2:
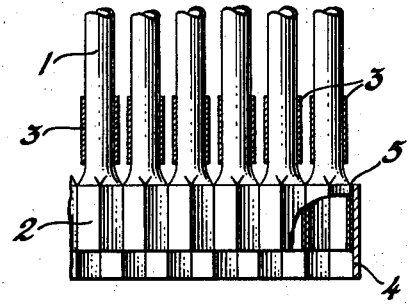
Fig. 2 is a fragmentary view, partly in section, of a number of tubes bounded by a frame and with brazing foil applied to the tubes prior to immersion in the heated molten salt.

For joining and sealing the enlarged end portions 2—2 of the tubes in a radiator core, each tube has placed on it, prior to assembly, a predetermined amount of brazing material, which, when the tubes are assembled, will lie adjacent to the joints formed by the enlarged hexagonal portions of the tubes. The application of the brazing material may be effected in any suitable fashion, as for example by spraying or by wrapping a thin foil around each tube as is illustrated at 3 in Fig. 2. If the complete core is to be made up of a number of sections, as is illustrated in the drawing, the hexagonal end portions in each face are embraced by a band or frame 4. This frame, incidentally, will need to be of corrugated outline longitudinally thereof to fit in nested relation with the flat, angularly arranged, exposed walls of the outermost tubes in the assembly. Optionally, a layer of brazing foil may be placed as at 5 between the band and the tube ends.

Figure 3:
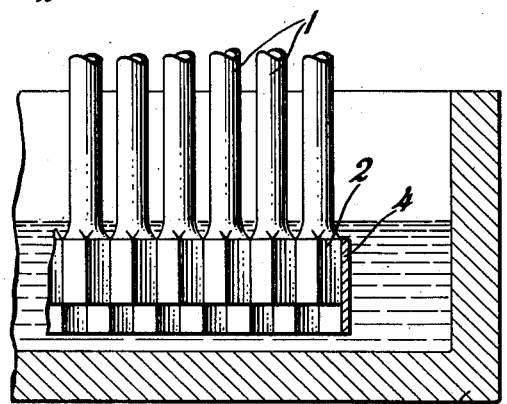
Fig. 3 illustrates the parts submerged in a salt furnace.

Regardless of whether the frame is employed, the brazing operation consists of immersing successively the opposite faces of the tube assembly in the molten salt contained within a suitable crucible 6 as indicated in Fig. 3. Salt bath furnaces in general use for heat treating will be found suitable to the present purpose. The submersion of the parts in the molten salt has the important advantage of reducing or eliminating completely oxidation in the joint surfaces incident to the temperature increase to which they are subject. Consequently, a stronger and better bond is had.

Since the tube ends in the opposite faces of the assembly are separately submerged in the furnace, the molten salt will be maintained at proper temperature to heat the submerged portions and melt the adjacent fusible material for its gravity flow down the vertical tube surfaces and into the joints between the contacting flat walls. Likewise the framing band 4 is united to the tube ends through the fusion and coherence of the intervening brazing material. By proper control of the temperature and space of time required for the brazing operation, and because of the concentration of applied heat, no annealing action will be produced in the tube and the brazing material at the uppermost ends of the tubes will remain below its melting point. The successive submersions of opposite faces of the core sections completes the assembly.

Figure 4:
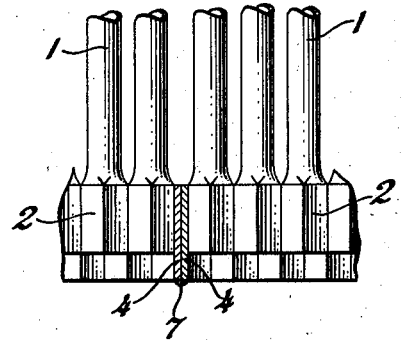
Fig. 4 is a detailed view showing the union between frames of two core sections and Fig. 5 is a detailed view of another type of core adapted to the salt bath brazing process.

It will be understood that the brazing operation may be performed on a full sized core but if, because of limitations in the type of equipment or other reasons, it is preferable to form the core in sections, then the frames of the several sections may be joined together, as for example by mating the frames as shown in Fig. 4 and braze joining the abutting surfaces at 7 with the aid of a hand torch.

Figure 5:
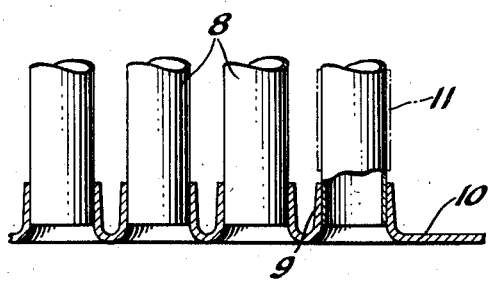

This brazing process may be practiced on other types of thin wall structures requiring concentrated heat application at spaced points, as an instance of which Fig. 5 is incorporated in the drawing and shows one end of a core comprising a number of spaced tubes 8, fitted to corresponding tubular projections 9 in a header plate 10, there being a similar header plate fitted to the opposite ends of the tubes. The tubes 8 and projections 9 are illustrated as being of uniform diameter throughout and telescoped together. Optionally the interfitting portions may be tapered for seating one within the other, but in any event the brazing material can be applied to the tubes as at 11 adjacent the joints and caused to flow to the joint surface upon immersion in the heated molten salt, first of one end face and then of the other, as before described.

We claim:

In the manufacture of heat exchangers of the type having a number of spaced tubes with opposite end portions expanded and nested together, the method of brazing said end portions comprising applying solid coatings of brazing material to portions of the tubes spaced inwardly of the opposite end portions, assembling a number of such tubes with their uncoated end portions nested together in surface contact, brazing one face of the tube assembly by immersion of the nested ends in a heat concentrating liquid to melt and flow the brazing material downwardly between the nested ends, and then turning the assembly end for end and similarly brazing the other face thereof.

LEROY W. SHUTTS.
PHILIP S. ROSENBERG.